(12) United States Patent
Kervern (10) Patent No.: US 7,463,554 B2
(45) Date of Patent: Dec. 9, 2008

(54) METHOD OF DETECTING AND VIEWING LOW-POWER MOVING ACOUSTIC SOURCES

(75) Inventor: Gilles Kervern, Plouzane (FR)

(73) Assignee: Thales (FR)

( * ) Notice: Subject to any disclaimer, the term of this patent is extended or adjusted under 35 U.S.C. 154(b) by 93 days.

(21) Appl. No.: 11/629,700

(22) PCT Filed: Jun. 2, 2005

(86) PCT No.: PCT/EP2005/052546

§ 371 (c)(1),
(2), (4) Date: Dec. 15, 2006

(87) PCT Pub. No.: WO2005/124386

PCT Pub. Date: Dec. 29, 2005

(65) Prior Publication Data

US 2007/0185654 A1    Aug. 9, 2007

(30) Foreign Application Priority Data

Jun. 15, 2004    (FR) .................................. 04 06475

(51) Int. Cl.
*G01S 3/801* (2006.01)
(52) U.S. Cl. ..................................................... 367/118
(58) Field of Classification Search .................. 367/118
See application file for complete search history.

(56) References Cited

U.S. PATENT DOCUMENTS 6,501,705 B1   12/2002   Hong et al.

(Continued)

FOREIGN PATENT DOCUMENTS

| FR | 2805616 A1 | * | 8/2001 |
| FR | 2821163 A1 | * | 8/2002 |
| WO | WO 9301506 A1 | * | 1/1993 |

(Continued)

OTHER PUBLICATIONS

Swift M et al: "Tracking weak targets with a grid search approach using spatially distributed sensors" Data Fusion Symposium, 1996. ADFS '96., First Australian Adelaide, SA, Australia Nov. 21-22, 1996, New York, NY, USA, IEEE, US Nov. 21, 1996, pp. 7-12, XP010216714.

*Primary Examiner*—Dan Pihulic
(74) *Attorney, Agent, or Firm*—Lowe Hauptman Ham & Berner, LLP (57) ABSTRACT

The inventive method relates to the field of submarine detection and deals in particular with the problem of detecting low-power acoustic underwater objects by passive detection systems, of the passive drifting buoy type, which are used by maritime patrol systems, for example. The method consists in processing the complex amplitude-azimuth spectrum of an acoustic signal received by a directional buoy. For different target models envisaged, this processing involves associating the complex frequency components of the received signal, located along the time-evolution curve of the frequency of a signal corresponding to a model target, and comparing the modulus and argument variation of these frequency components with the modulus and argument variation over time of the spectral components of the signal corresponding to the model, the processing using both the amplitude and azimuth information contained in the received signal. According to the invention, the processing can be used to produce representations of the evolution of the received signal, both in a frequency form and in a geographic form. In addition, it allows for the merging of data originating from several buoys being used simultaneously in one and the same area.

14 Claims, 9 Drawing Sheets

U.S. PATENT DOCUMENTS

| | | | |
|---|---|---|---|
| 6,704,246 B1 * | 3/2004 | Kervern | 367/88 |
| 6,937,539 B2 * | 8/2005 | Kervern et al. | 367/129 |
| 2004/0071046 A1 * | 4/2004 | Kervern et al. | 367/129 |
| 2007/0185654 A1 * | 8/2007 | Kervern | 702/5 |

FOREIGN PATENT DOCUMENTS

| | | | |
|---|---|---|---|
| WO | WO 02067008 A1 * | 8/2002 |
| WO | WO 2005124386 A1 * | 12/2005 |

* cited by examiner

METHOD OF DETECTING AND VIEWING LOW-POWER MOVING ACOUSTIC SOURCES

CROSS-REFERENCE TO RELATED APPLICATIONS

The present application is based on International Application No. PCT/EP2005/052546, filed on Jun. 2, 2005, which in turn corresponds to French Application No. 04 06475, filed Jun. 15, 2004, and priority is hereby claimed under 35 USC 119 based on these applications. Each of these applications are hereby incorporated by reference in their entirety into the present application.

FIELD OF THE INVENTION

The inventive method relates to the field of underwater detection and deals in particular with the problem of detecting low-power acoustic underwater objects using passive detection systems, of the passive drifting buoy type, used by maritime patrol systems, for example.

CONTEXT OF THE INVENTION—PRIOR ART

In the field of maritime surveillance, passive directional buoys are routinely used for underwater detection. These buoys are, for example, DIFAR-type directional buoys. They comprise in particular an omnidirectional antenna and two bidirectional antennas. Each antenna is made up of sensors, the hydrophones, which transform the acoustic signal into an electrical signal. The captured acoustic signals are transmitted to a maritime patrol aircraft, for example by radio channel, onboard which the signal is processed and any targets are detected. The three antennas fitted on the buoy receive signals over a frequency band that is a few kilohertz wide. The detection is achieved by studying the time-evolution of the spectrum of these received signals. This spectral analysis is normally analyzed by a human operator using a particular time/frequency representation, known as a lofargram. An illustration of this type of representation is given in FIG. 5.

Regarding passive detection, the main problem encountered is that of the weakness of the signal-to-noise ratio of the signals being listened to. In practice, those underwater elements that are deemed to be of modern interest are increasingly more discreet, which is reflected in the emission of an increasingly weak basic noise, whereas the width of the acoustic band listened to limits the sensitivity of the buoys, so the range of the buoys is limited in practice. The weakness of the received signals means that, even after spectral analysis, the weakness of the contrast obtained between the ambient clutter and the basic emissions of any target is such that, on a lofargram-type image, for example, the useful signal is literally buried in the noise and the image can no longer be analyzed by the operator.

To overcome this problem, various solutions based on the integration of the received signal are currently implemented. Integration of the signal is normally achieved either by spectral channel—which is referred to as static integration—or on a number of channels according to a predetermined frequency-evolution slope. These two integration methods have the main drawback of taking into account the evolution parameters of the potential target only to a very small extent. This is why they offer only a very imperfect solution to the problem posed.

SUMMARY OF THE INVENTION

To remedy the problem posed and avoid the drawbacks caused by the use of conventional integration methods such as those cited previously, the subject of the invention is an adaptive method of processing the received acoustic signal performing a rolling operation involving associating spectral components obtained by completing a series of consecutive spectral analyses of said signal. This association of spectral components constitutes a signal called observation vector that we try to identify with a predetermined model, this model corresponding to the signal originating from a target having a given evolution relative to the buoy. According to the inventive method, this component association is carried out iteratively, each observation vector corresponding to a given target model, the number of models varying in particular according to the size of the field of evolution of the target and the number of evolution parameters taken into account. The degree to which the observation vector is identified with a model is reflected in the value of a probability coefficient calculated from the components of the observation vector and the components of the vector characterizing the analysis time evolution of the signal corresponding to the target model concerned. Each target model has a corresponding observation vector and an evolution model that are correlated. The value of the calculated probability criterion indicates the degree to which the observed signal is identified with that originating from a model target. The inventive method thus leads to the creation of a data table containing, for each defined model, the set of parameters associated with the model and the calculated probability criterion value. The data in this table is then used to construct various forms of representations, spectral or geographic for example.

The inventive method has the advantage of being able to be implemented in a continuous arid rolling manner. The observation vectors are created from a set of consecutive spectral analyses of the received signal, two consecutive sets of spectral analysis possibly including a number of common spectral analyses.

The inventive method offers the advantage of being adaptive and therefore being best adjusted to the received signal.

The inventive method advantageously uses the information relating to the azimuth of the target relative to the buoy taken from the received signal and normally not used.

The use of predefined evolving target models also makes it possible to associate with the received signal the parameters relating to the model and create a geographic representation of the evolution of the target relative to the buoy. The association for one and the same target of the geographic representations of the evolution of this target supplied by a number of buoys also makes it possible advantageously to produce a synthetic map of the movement of the target in a given space.

DESCRIPTION OF THE FIGURES

Other characteristics and advantages will become apparent from the description that follows, given in light of the appended figures which represent:

FIG. 1, an illustration of an assumption of movement of the target relative to the buoy, taken by way of example, FIG. 2, a graphic representation of the time-evolution of the amplitude and of the frequency of the signal originating from a target animated by the movement illustrated in FIG. 1, FIG. 3, an illustration of the time-evolution of the azimuth of the target, FIG. 4, a representation of the central part of the time-variation curve of the frequency of the signal originating from the target, FIG. 5, the illustration of the analysis of the preceding representation in the form of a lofargram-type image, FIG. 6, a block diagram of the processing operations prior to implementation of the inventive method;

DETAILED DESCRIPTION

To clarify and simplify the description, the inventive method is explained through a particular case that can be easily applied more generally. This particular case corresponds to that of a target moving along a path roughly equivalent to a straight line, such as that illustrated by FIG. 1. In this figure, the target is represented by a submarine 11 passing through the listening area of the buoy 12 along a roughly straight-line path 13. The target moves at a velocity symbolized by the vector $\vec{v}$.

Figure 1:
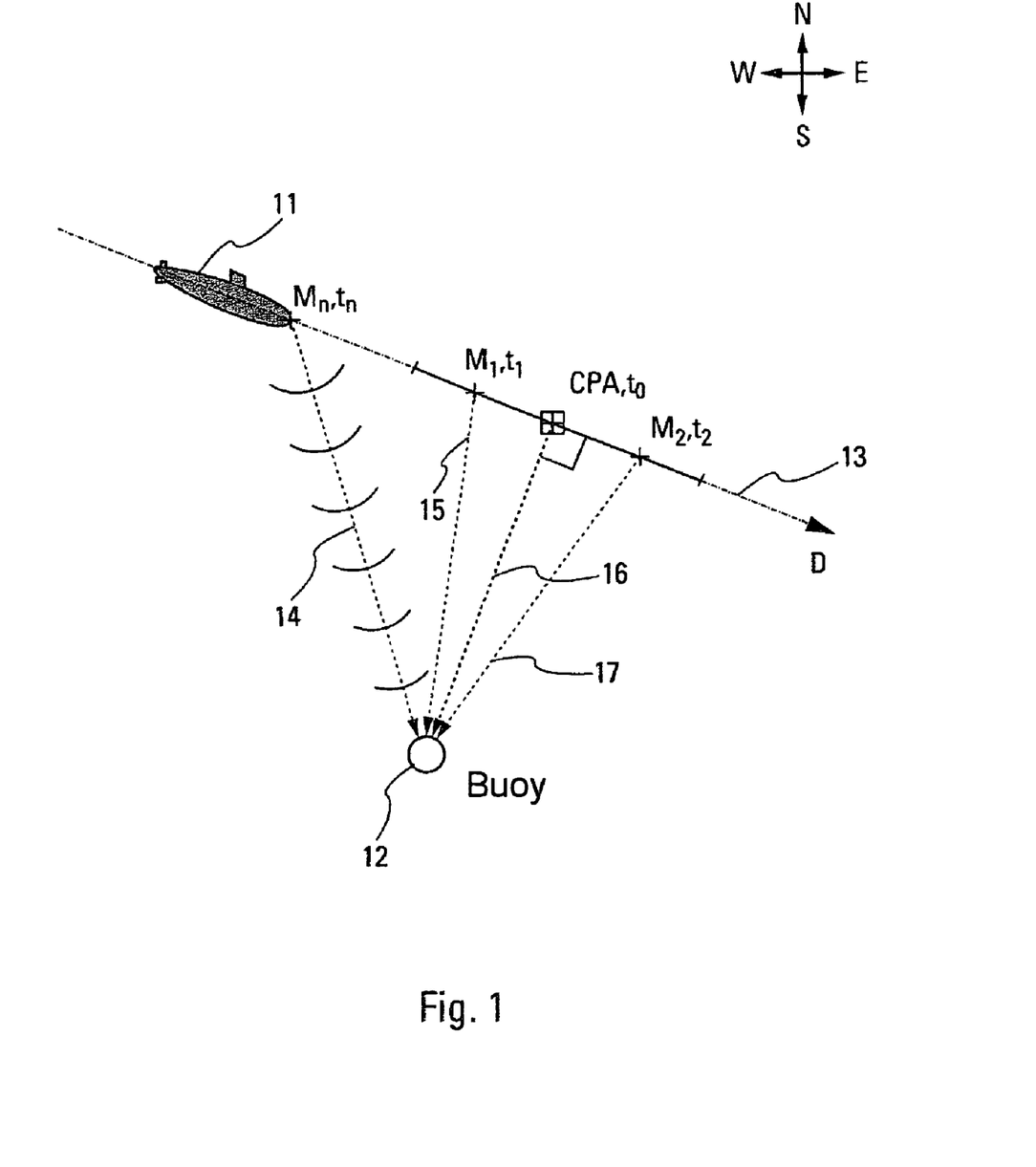

As it moves, the submarine emits a basic noise towards the buoy, with a propagation time $t_p$ that varies according to the variation of the position of the submarine relative to the buoy. The distance between buoy and submarine changes over time, passing through a minimum corresponding to the point in the path of the submarine at which the straight line 16 linking this point to the buoy is at right angles to the path of the target. The distance $d_{CPA}$ from the buoy to this point, called CPA (Closest Point of Approach), represents the shortest distance between the buoy and the target.

Taking into account the assumption of a target driven in a substantially straight line, it is possible to establish the time-evolution laws of the amplitude and of the frequency of the signal received by the buoy.

The distance between buoy and target can be expressed by the following relation:

$$d_{buoy\text{-}target} = \sqrt{d_{CPA}^2 + (vt)^2} \quad [1]$$

The target can be likened to a noise generator emitting a spherical wave with an amplitude varying by 1/d. It is therefore possible to write:

$$\frac{s(t)}{S_{CPA}} = \frac{d_{CPA}}{d_{buoy\text{-}target}} = \frac{1}{\sqrt{1 + \left(\frac{v(t-t_p)}{d_{CPA}}\right)^2}} \quad [2]$$

where $s(t)$ and $s_{CPA}$ correspond to the signal received respectively at any instant and at the instant when the target passes through the CPA to within the sound propagation delay. $t_p$ represents the propagation time of the sound between the target and the buoy.

This can also be written, according to the corresponding signal-to-noise ratios:

$$s/n(t) = \frac{S/b_{CPA}}{1 + \frac{v^2(t-t_p)^2}{d_{CPA}^2}} \quad [3]$$

In the relations [1] and [2], the origin of the times is taken to be the instant $t_0$ when the target passes through the CPA.

The instantaneous frequency of the signal received by the buoy can also be expressed by the following relation:

$$f(t) = f_{cpa}\left\{1 - \frac{v^2(t-t_p)}{c\sqrt{v^2(t-t_p)^2 + d_{CPA}^2}}\right\} \quad [4]$$

where $t_p$ represents the propagation time of the sound between the target and the buoy. This propagation time which, in practice, is less than a second, given the range of the buoys used which is normally less than 1500 m, will be disregarded in the rest of the description.

By introducing the reduced variables $$\tau = \frac{vt}{d_{cpa}} \text{ and } \rho = \frac{v}{c},$$

the expressions [2] and [4] are simplified, so the following expressions can be used:

$$\frac{s(t)}{S_{CPA}} = \frac{1}{\sqrt{1+\tau^2}} \quad [5]$$

and $$\frac{f(t)}{f_{cpa}} = 1 - \rho \frac{\tau}{\sqrt{1+\tau^2}} \quad [6]$$

or even, if $s_i$ is equal to $s(t)$, for $t=t_i$:

$$S_i = \frac{1}{\sqrt{1+\tau_i^2}} \cdot S_{CPA} = h_i \cdot S_{CPA} \quad [7]$$

with $h_i = \frac{1}{\sqrt{1+\tau_i^2}}$.

$h_i$ is called the signal attenuation factor.

The relations [5] and [6] can be used to determine the time-evolution of the amplitude and of the frequency of the signal received along the path of the target. This evolution is illustrated by the timing diagrams 2-*a* and 2-*b* of FIG. 2.

Figure 2:
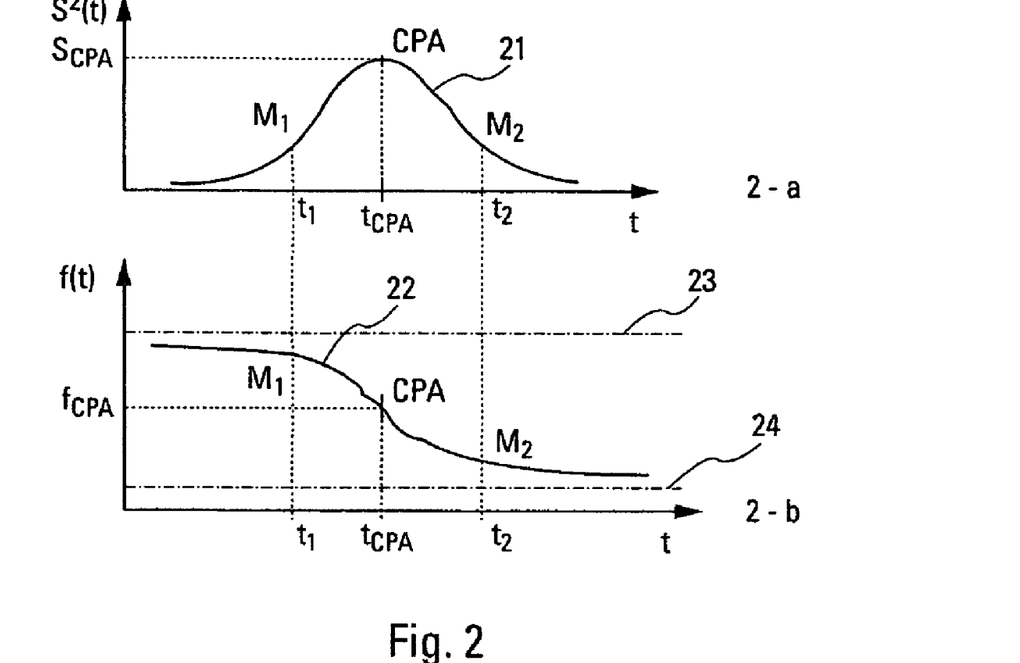

The timing diagram 2-*a* shows that the amplitude curve of the received signal is subject to a major variation over a portion 21 roughly between the points $M_1$ and $M_2$. This passes through a maximum for the point corresponding to the CPA. Outside of the area $[M_1, M_2]$, the attenuation of the received signal becomes very great, such that the signal is buried in ambient clutter.

Similarly, the timing diagram 2-b shows that the frequency curve of the signal received by the buoy varies greatly over a portion 22 roughly between the two points $M_1$ and $M_2$ to tend slowly towards asymptotes 23 and 24 either side of this area.

Figure 3:
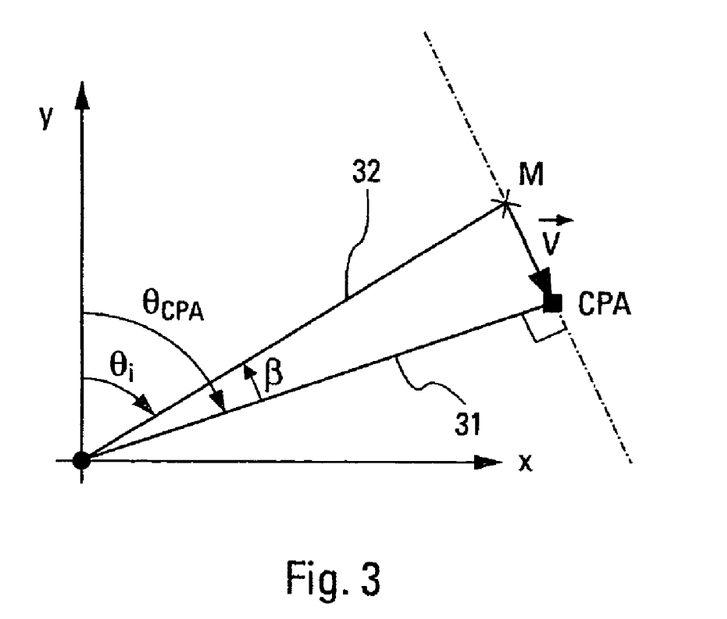

Concerning the movement of the target relative to the buoy, it is also possible to focus on how its position evolves through its magnetic azimuth. FIG. 3 illustrates this evolution. Let $\theta_{CPA}$ be the azimuth of the target on its passage through the CPA and $\beta$ be the angle formed between the buoy—CPA direction 31 and the buoy—target direction 32. The following expression can be used:

$$\theta = \theta_{CPA} + \beta \quad [8]$$

Moreover, the distance traveled by a target, the parameters of which are $d_{CPA}$, v, $f_{CPA}$ and $t_{CPA}$, can be expressed by the known expression:

$$d(t) = v \cdot t \quad [9]$$

and the angular deviation expressed in radians between the azimuth $\theta(t)$ of the target and the azimuth $\theta_{CPA}$ of the CPA can be expressed:

$$\beta(t) = \text{Arctan}\left(\frac{v \cdot t}{d_{CPA}}\right) = \text{Arctan}(\tau) \quad [10]$$

or even, if $\theta_i$ is equal to $\theta(t)$, for $t = t_i$ $$\theta_i = \theta_{cpa} + \text{Arctan}(\tau_i) \quad [11]$$

The origin of the times is taken to be the instant $t_{CPA} = t_0$ when the target passes through the CPA.

The relations [5], [6] and [11] express the parameters s(t), f(t) and θ(t) that can be used to characterize a target emitting a basic noise at the frequency $f_{CPA}$ with a sound power level $s_{CPA}$ when it passes through the CPA.

The extraction of these parameters is normally achieved by spectral analysis of the signal received by the buoy. Spectral analysis can be used in particular to construct a representation of the received signal in a time-frequency plane, the principle of which is illustrated by FIG. 4.

In this figure, the amplitude variation of the received signal represented by the curve 41 is depicted by the thickness of the line. As was seen previously in FIG. 2, the central part of the curve, which corresponds roughly to the portion of path between the points $M_1$ and $M_2$ for which the amplitude of the signal is very much greater than the amplitude of the ambient noise, can be distinguished from the distal parts 43 and 44 of the curve for which the amplitude of the signal diminishes roughly to approximate the amplitude of the noise.

Figure 4:
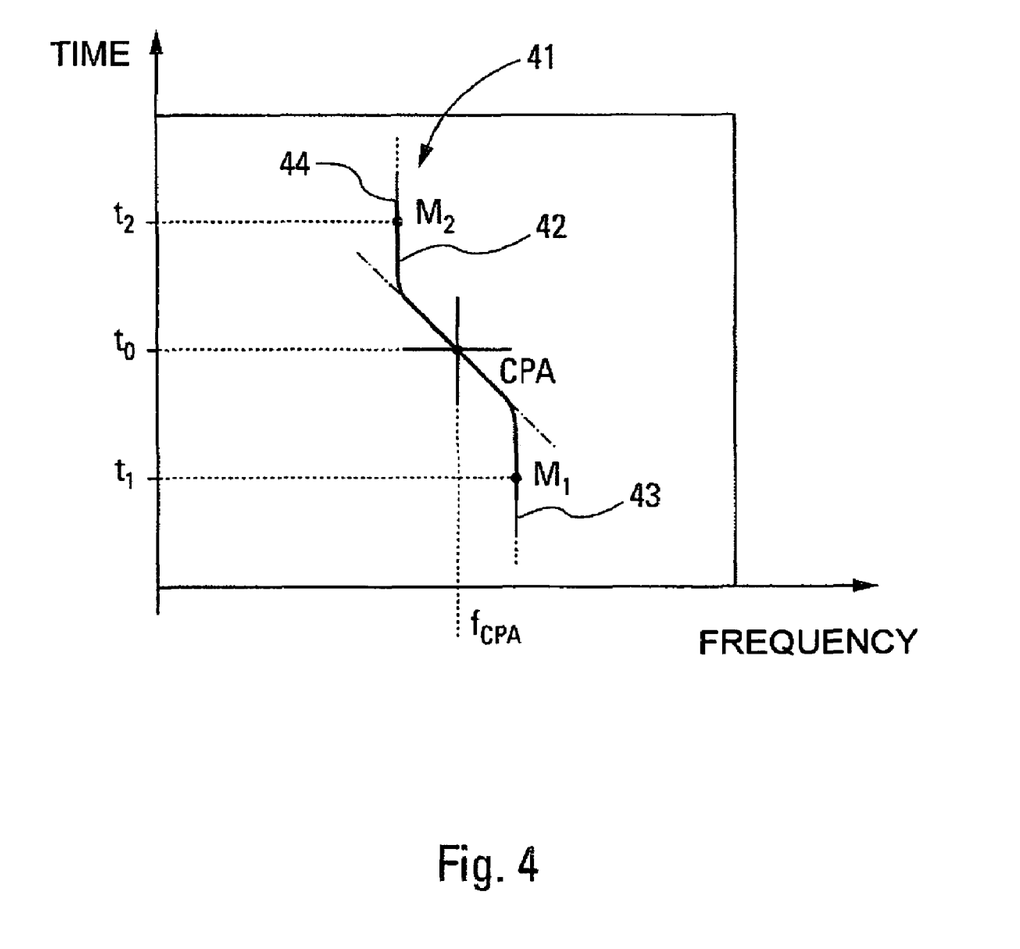
Figure 5:
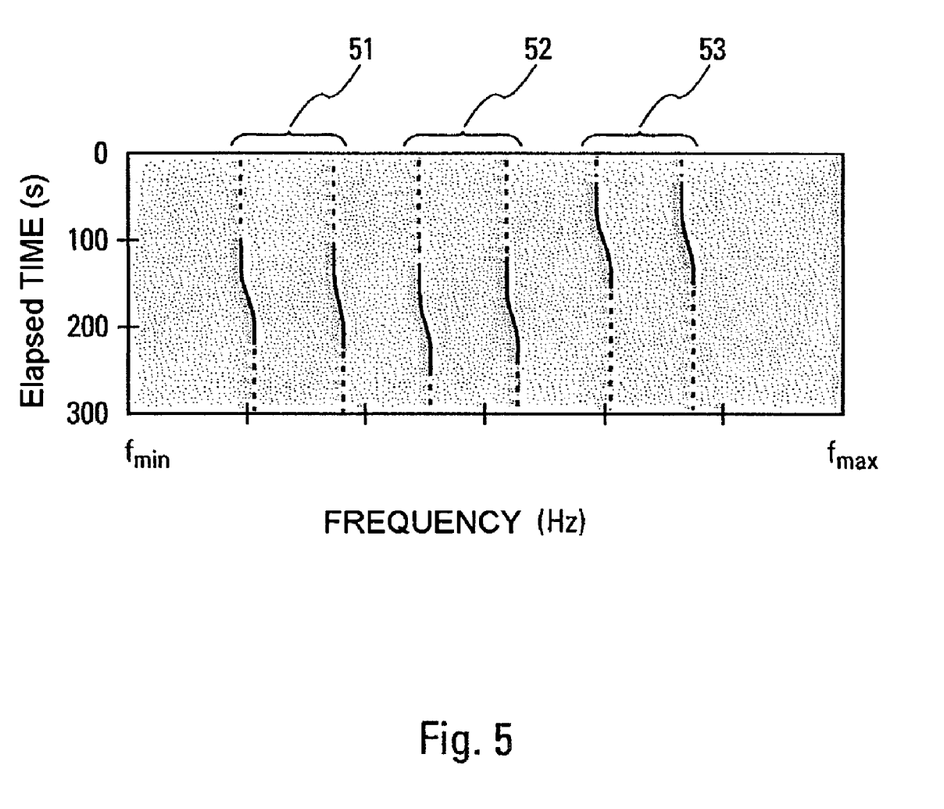

The type of spectral representation illustrated by FIG. 4 is used routinely to perform a visual analysis of the signals received by a buoy in the form of an image known as a LOFARGRAM, which represents the spectrogram of the received signal. This image is constructed from the spectral analysis of the received signal using a continuous frequency sweep, each line displayed representing the result of the spectral analysis of the signal obtained at a given instant preceding the display. The duration of the sweep of the frequency band displayed can, for example, be equal to the time needed for the spectral analysis of the received signal. FIG. 5 gives a simplified representation of this spectrogram. In practice, this spectrogram is displayed in video image form, the variation of the amplitude of the received signal being reflected by the variation in the brightness of the image.

A spectrogram like the one shown in FIG. 5 can normally be used to provide a continuous view of the spectrum of the received signal, maintaining the view of a constant number of consecutive lines corresponding to the successive spectral analyses. The image is thus refreshed continuously, with the display on screen of a new line causing the display of the oldest line to disappear. This type of scrolling representation is commonly called a "waterfall" spectrogram. FIG. 5 gives an example of a spectrogram representing the evolution of the received signal in the presence of three moving targets 51, 52 and 53. Each of the targets emits a basic noise comprising two spectral rays. The spectrogram can be used to follow the time-evolution of the position of the targets, arriving in the vicinity of the CPA, passing through the CPA and then the moving away, the evolution being reflected by the increase followed by the decrease in the luminous intensity of the traces corresponding to the targets.

As shown in FIG. 5, the number of consecutive lines displayed is enough to allow all of the evolution of the target in the vicinity of the CPA to be viewed, which normally corresponds to a display of a few minutes. In the example of FIG. 5, the lines displayed correspond to an elapsed time of 300 s, corresponding to the display of a hundred or so lines, each corresponding to the spectral representation of the signal at a given instant. The refresh period of the lines corresponds to the time needed for each spectral analysis.

This type of representation has the advantage of simplicity and ease of use. However, inasmuch as it uses only the amplitude of the spectral components of the received signal, it does not provide a response to the problem posed by the weakness of the noise emitted by modern underwater targets. The spectral components of the received signal can have an amplitude roughly equal to the ambient noise, so their visual analysis becomes difficult.

Figure 6:
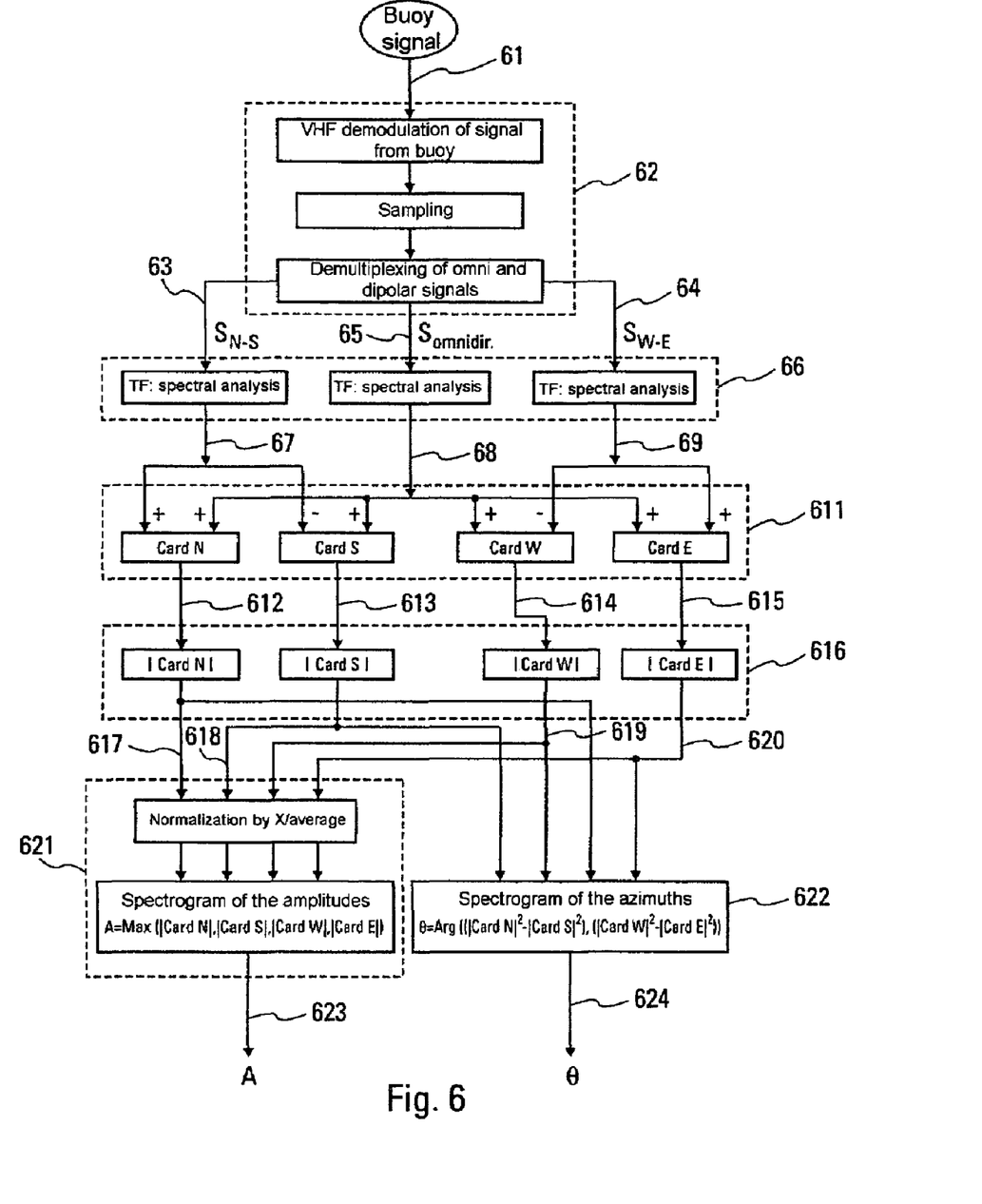

To remedy this problem, the inventive method proposes simultaneously processing the amplitude and azimuth information supplied by the received signal. To this end, according to the invention, the received signal is the subject of a preliminary spectral analysis intended to obtain, for each spectral component, amplitude information associated with angular information characteristic of the azimuth associated with the spectral component. FIG. 6 presents a non-limiting example of an operation flow diagram making it possible to perform the preliminary spectral analysis of the signal received by a DIFAR-type buoy.

FIG. 6 gives the detail of the processing steps involved in the preliminary processing. This processing is normally performed onboard the aircraft which performs the surveillance and analyzes the signals originating from the buoys. The signals to be processed are received in the form of a VHF signal 61 modulated by the signals received by the various sensors of the buoy and the signal relating to the orientation of these sensors relative to north. The first step 62 in the processing therefore consists in demodulating the received signal, in sampling the demodulated signal and in performing a demultiplexing of the signals so as to isolate the signal 65 obtained from the omnidirectional sensor $S_{omnidir}$, and the signals originating from the directional sensors. In this regard, it should be remembered that the directional sensors are mounted on the buoy to form orthogonal receive paths. The signals obtained from the directional sensors are also corrected using orientation information supplied by the buoy, so as to obtain signals $S_{N-S}$ 63 and $S_{E-W}$ 64 which represent the signal received in the N-S and E-W directions. The duly obtained signals $S_{N-S}$, $S_{E-W}$ and $S_{omnidir}$ are then the subject of a spectral analysis step 66 during which each signal is processed separately. The spectra 67, 68, and 69 obtained are then combined as indicated in the figure in a step 611. The purpose of combining the spectra is to form the signals 612, 613, 614, and 615 corresponding to four directionally unambiguous receive paths respectively oriented towards north, south, east and west. Each of the paths formed present a cardioid-shaped radiation pattern.

The spectra corresponding to each of the cardioids are then used in a step 616 which calculates the moduli 617, 618, 619 and 620 of each of the spectra. The moduli of the spectra are used in the steps 621 and 622 of the preliminary processing, so as to construct a signal 623 corresponding to the spectrum of the amplitudes and a signal 624 corresponding to the spectrum of the azimuths.

In the processing illustrated by FIG. 6, the signal 623 is obtained by selecting, for each frequency, the value of the signal corresponding to the path with the spectrum that exhibits the greatest amplitude at the frequency concerned. Thus, for each frequency, the constructed amplitude spectrum can be expressed:

$$A = \text{Max}(|\text{Card } N|, |\text{Card } S|, |\text{Card } W|, |\text{Card } E|) \quad [12]$$

The expression [12] shows that the preliminary processing produces an amplitude spectrum which advantageously takes account of the azimuth of the target and the directivity of the buoy.

As for the signal 624, this is obtained by calculating, for each frequency, the argument of the complex number for which the real and imaginary parts are respectively calculated from the moduli 617, 618 and 619, 620 of the signals corresponding to the N, S, W and E receive paths formed. Thus, for each frequency, the spectrum of the calculated azimuths can be expressed:

$$\theta = Arg((|\text{Card } N|^2 - |\text{Card } S|^2, |\text{Card } W|^2 - |\text{Card } E|^2)) \quad [13]$$

At the end of the preliminary processing illustrated by FIG. 6, a spectral breakdown of the received signal is available, with frequency components that can be expressed: $z = A.\exp(j\theta)$. $A$ and $\theta$ being defined by the relations [12] and [13], the quantity z exhibits the characteristic of almost following a two-dimensional Gaussian law. Similarly, the real component $x = A.\cos(\theta)$, and imaginary component $y = A.\sin(\theta)$ are almost real, centered Gaussian random variables. These Gaussian characteristics mean that, in the absence of a target, the amplitude A follows a Rayleigh law and the azimuth $\theta$ a law uniformly distributed over $[0, 2\pi]$ and that, in the presence of a target, A follows a Rice law and $\theta$, in the case where the signal-to-noise ratio is high, a normal law centered on the value of the azimuth of the noise generator. These statistical properties are advantageously exploited by the inventive method.

The preliminary processing described through FIG. 6 represents one of several means of constructing a spectral representation of the received signal, which has the statistical properties stated above. As stated previously, this processing is described as a nonlimiting example of the invention. Any other processing producing a spectral representation exhibiting a similar statistic in the absence and in the presence of a target can be applied to condition the signal prior to application of the inventive method.

As stated previously, the main object of the method according to the invention is to improve the contrast of the received signal relative to the ambient noise in order in particular to enhance the quality and legibility of the spectrograms presented to the operator. To this end, the inventive method iteratively performs a processing on the data obtained from a set of N consecutive spectral analyses. This processing entails first selecting a model target with known parameters, then creating the vector M corresponding to the evolution, over N spectral analyses, of the spectrum of the signal that the buoy would receive in the presence of a target similar to this model target. The processing then involves selecting, for each spectral analysis of the signal actually received, the component $z_i$ having the same frequency as the component $m_i$ of the previously defined vector M. The set of the components $z_i$ forms an observation vector Z. This vector Z is then compared to the vector M and the result of the comparison, if it satisfies certain criteria, is memorized, together with the parameters associated with the model target concerned.

An identical processing is performed for each vector M created, that is, for each defined target model. The various target models are obtained by varying, within chosen ranges, the parameters $f_{CPA}$, v, $d_{CPA}$ and $t_{CPA}$ which characterize a target. A target model is constructed by giving particular values to a set of evolution parameters comprising the frequency $f_{CPA}$ of the basic noise generated by the target, also called static frequency, the velocity v of the target, the distance $d_{CPA}$ from the CPA to the buoy and the instant $t_{CPA}$ when the target passes through the CPA.

As seen previously through FIG. 4, the time-evolution of the parameters linked to a target is reflected in the time-frequency plane by a curve 41 in bayonet form, exhibiting an inflection point at the frequency $f_{CPA}$, or static frequency, and two asymptotes. The frequency position of the asymptotes and the frequency variation slope of the curve in the vicinity of the CPA are particularly dependent on the velocity of the target.

Each component $z_i$ of the vector Z is chosen from the spectral components $z = A.\exp(j\theta)$ constituting the spectral analysis of rank i corresponding to an instant $t_i$. For each spectral analysis, the component retained is the one with the frequency that is equal to the frequency of the component $m_i$ of the corresponding vector M.

A given model target has associated with it a frequency-evolution curve of the signal received by the buoy, which appears like that of the curve in FIG. 4. Consequently, in a time-frequency representation similar to that of FIG. 4, the components $z_i$ will thus be distributed along a curve similar to the curve 41 and could be superimposed on the curve corresponding to the target model.

Consequently, the vector Z is expressed:

$$Z = \begin{pmatrix} \vdots \\ z_i = a_i e^{j\theta_i} \\ \vdots \end{pmatrix} \quad [14]$$

i being between 1 and N and the frequency of the components $z_i$ changing from one spectral analysis to another, along a curve similar to the curve 41. Each component $z_i$ is characterized by its amplitude $a_i$ and its azimuth $\theta_i$. Similarly, the vector M of the evolutions expected over time of the spectrum of the received signal for a target corresponding to a given model, is expressed:

$$M = \begin{pmatrix} \vdots \\ m_i = \dfrac{e^{j\arctan(\tau_i)}}{\sqrt{1 + \tau_i^2}} \\ \vdots \end{pmatrix} \quad [15]$$

The components $m_i$ of the vector M represent the time-evolution, over the N spectral analyses, of the spectral components of the signal originating from the model target.

The vector Z is then correlated with the vector M in order to evaluate the degree to which the observations $z_i$ made are identified with the components of the theoretical vector corresponding to the model target. Thus, if there is a close correlation between the vectors Z and M, the vector Z can be considered to reveal the detection of a real target evolving in the space covered by the buoy. This real target can, also, be defined by the parameters of evolution of the model target. On the other hand, if the components of the vector Z are not very identifiable with those of the theoretical vector, this means that no real target having parameters of evolution similar to those of the determined model is detected.

The correlation operation is performed, in a known manner, by means of the calculation of a probability ratio generalized from the observation to the model. This probability ratio can be expressed:

$$\Lambda_g(Z) = \frac{|M*Z|^2}{2\|M\|^2} \quad [16]$$

When the value of the criterion $\Lambda_g$ is considered to enable the identification of the observation with the model, the detected target will be characterized by the value of the parameters $f_{CPA}$, v, $d_{CPA}$ and $t_{CPA}$ of the model. The azimuth of the detected target, on its passage through the CPA, will be determined by the expression:

$$\theta_{cpa} = \arg\left(\frac{\overline{M}Z}{\|M\|^2}\right) \quad [17]$$

There are then available all the parameters needed to define the position of the target at the instant corresponding to the end of processing of a set of N spectral analyses.

For a set of N spectral analyses, the processing described previously is applied by the inventive method as many times as there are possible target models. The number of possible models is theoretically given by the sizes of the ranges of different values that the various parameters that characterize a target can take. In practice, it is also essential to take account of the time needed to process a model and the total time available to process all the models, which depends on the time needed to perform N consecutive spectral analyses.

Figure 7:
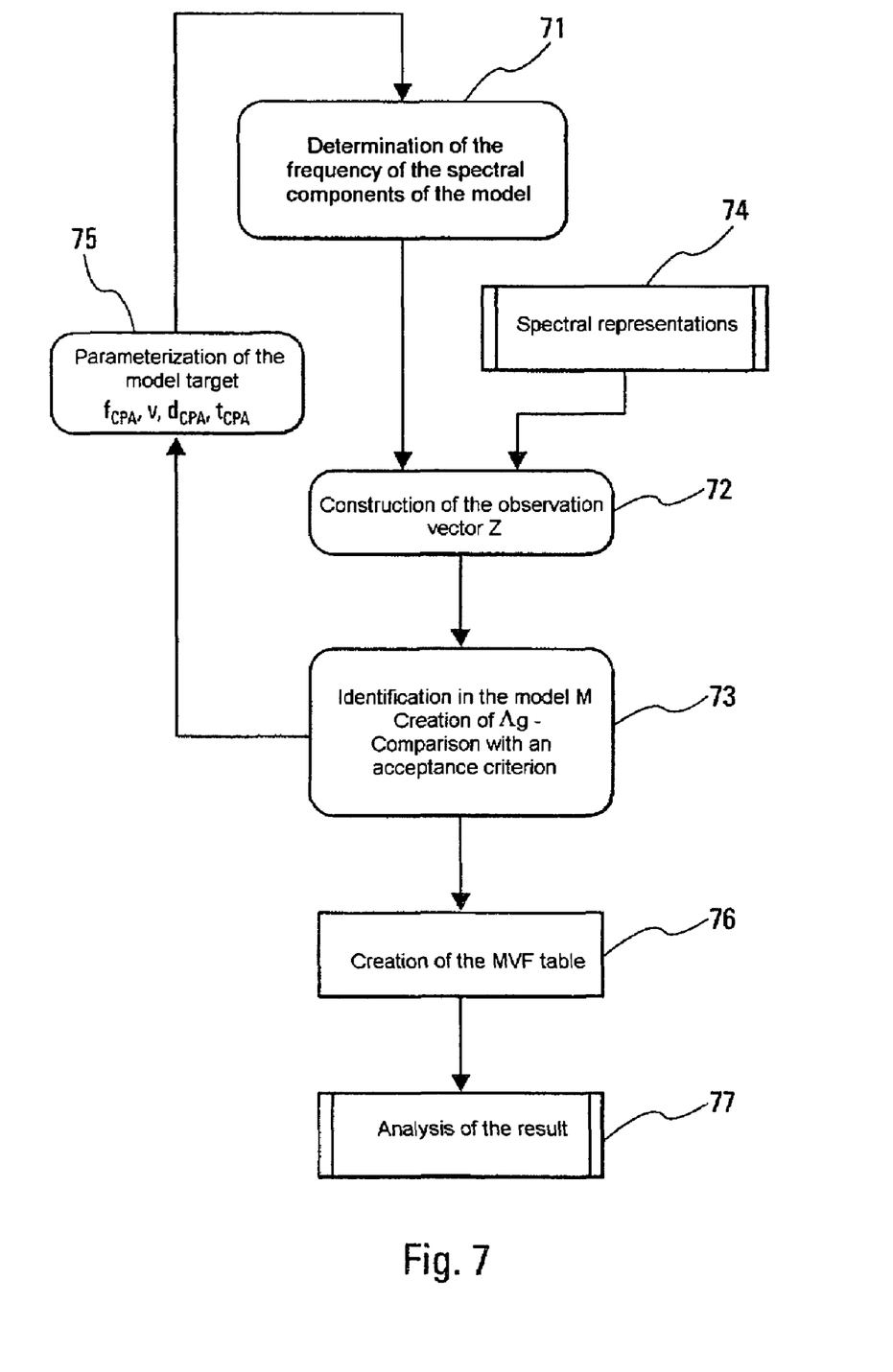
FIG. 7, a flow diagram illustrating the iterative nature of the inventive method.

The flow diagram of FIG. 7 illustrates the iterative nature of the inventive method. In FIG. 7, the individual processing for creating an observation vector for successive frequencies determined by a target model, and the operation for identifying the vector Z with the model M, are represented by the tasks 71, 72 and 73 in the flow diagram. The creation of the N consecutive spectral analyses of the signal received by the buoy is represented by the task 74. The task 75 corresponds to the selection of a set of parameters $\{f_{CPA}, v, d_{CPA}, t_{CPA}\}$ characteristic of a target model. On each iteration, a new target model corresponding to a new set of parameters is selected from the set of possible models. The succession of the tasks 71, 72, 73 and 75 continues until all the possible models are used.

On each iteration, the results of the task 73 of identification with the model are the subject of a comparison with a criterion and a possible storage operation 76. The parameters $f_{CPA}$, v, $d_{CPA}$, $t_{CPA}$ $\Lambda_g$ and $\theta_{CPA}$ linked to the model concerned are stored in a table called MVF table, or maximum frequency probability table, to be used by the task 76 as described below in the description.

The iteration loop applied by the inventive method and presented in FIG. 7 in reality comprises a set of loops nested in a predetermined order. Each of the loops differs from the preceding one in that one of the parameters $\{f_{CPA}, v, d_{CPA}, t_{CPA}\}$ changes value so leading to the creation of a new model. Consequently, if P represents the quantity MZ, Q the quantity $\|M\|^2$, and R the probability ratio $\Lambda_g(Z)$, the inventive method can be described by the following theoretical algorithm:

Read the complex amplitude-azimuth lofar file of duration T

Reset MVF table intended to contain for each static frequency $f_{CPA}$ the data ($f_{CPA}$, $\Lambda_g$, $d_{CPA}$, $t_{CPA}$, v, $\theta_{CPA}$) corresponding to the various models defined.

Start of loop on static frequency assumptions: choose the $f_{CPA}$ value.

Start of loop on target velocity assumptions: choose a velocity value v

Start of loop on distance assumptions on passing through the CPA: choose a $d_{CPA}$ value.

Start of loop on time offset assumptions on passing through the CPA relative to the spectral analysis start instant: choose a $t_{CPA}$ value.

Zero variables that will contain the probability ratio R, its numerator P and its denominator Q.

Generate the vector Z

Start of loop on the instants $t_i$ of the N spectral analyses.

Determine the component $z_i$ corresponding to the model M concerned.

$P=P+P_i$ $Q=Q+Q_i$

End of loop on the instants $t_i$ of the N spectral analyses.

Determine the maximum probability ratio, determine the parameters of the model retained: $d_{CPA}$, $t_{CPA}$, v, $\theta_{CPA}$ Calculate the probability ratio: $R=|N|^2/(2.D)$.

If, for the frequency $f_{CPA}$ considered on the current iteration, current R>R of preceding iteration, then:

the R value contained in the MVF table for $f_{CPA}$ is readjusted by current R the value of $\theta_{CPA}$ is calculated new data ($f_{CPA}$, $\Lambda_g$, $d_{CPA}$, $t_{CPA}$, v, $\theta_{CPA}$) is saved in the MVF table.

End of loop on assumptions concerning the instant $t_{CPA}$ of passage through the CPA.

End of loop on assumptions concerning the distance $d_{CPA}$ on passage through the CPA.

End of loop on assumptions concerning the target velocity v.

End of loop on assumptions concerning the static frequency $f_{CPA}$.

The inventive method thus makes it possible to obtain, from signals received by the buoy, a table of data storing, for a particular set of values assigned to the parameters $f_{CPA}$, v, $d_{CPA}$ and $t_{CPA}$, the maximum value retained for the criterion $\Lambda_g$ and the corresponding angle $\theta_{CPA}$ value.

In practice, as stated previously, the total number of values that each of the parameters associated with the evolution of a model target can take is necessarily limited. In this respect, the following configuration represents a realistic example:

$f_{CPA}$ is examined on all the frequency channels defined by the spectral analysis, produced for example by FFT, $t_{CPA}$ is examined on all the instants corresponding to the creation of the results of a spectral analysis and varies from 0 to T, T representing the time to carry out the N spectral analyses;

V is examined over all the following velocities V:

$$V=\{-15, -12, -9, -6, -3, 0, 3, 6, 9, 12, 15\},$$

the velocities being expressed in m/s;

$d_{CPA}$ is examined over all the following distances D:

$$D=\{75, 210, 345, 480, 615, 750\},$$

the distances being expressed in m.

This example shows that, even with a relatively small number of values for each parameter, the number of calculation loops to be carried out in a limited time is high. This is why the number of models used is necessarily limited and does not cover all the possible target models corresponding to the variation bands of the different parameters. Thus, in the chosen example, no target model having a velocity of 7 m/s and presenting a distance to the CPA equal to 680 m can be taken into account. No observation vector therefore corresponds to such a target, and consequently no real target corresponding to this evolution model will be directly looked for.

The number of models envisaged is necessarily limited, so it is useful to fully exploit each model. To this end, the inventive method makes it possible advantageously to incorporate an operation making it possible to process, for a given model, not only the observation vector Z strictly corresponding to the model, but also the vectors located in the vicinity. The inventive method thus makes it possible to determine not only the observation vectors that strictly correspond to a given model, but also the observation vectors that correspond to unexamined adjacent models.

To do this, it is appropriate to determine for each spectral analysis the size of the frequency range from which the spectral component that will constitute an element of the observation vector associated with the model concerned is chosen. This determination can, for example, be done by analyzing the adjacent combinations of parameters. This analysis is illustrated by FIGS. 8 and 9.

Figure 8:
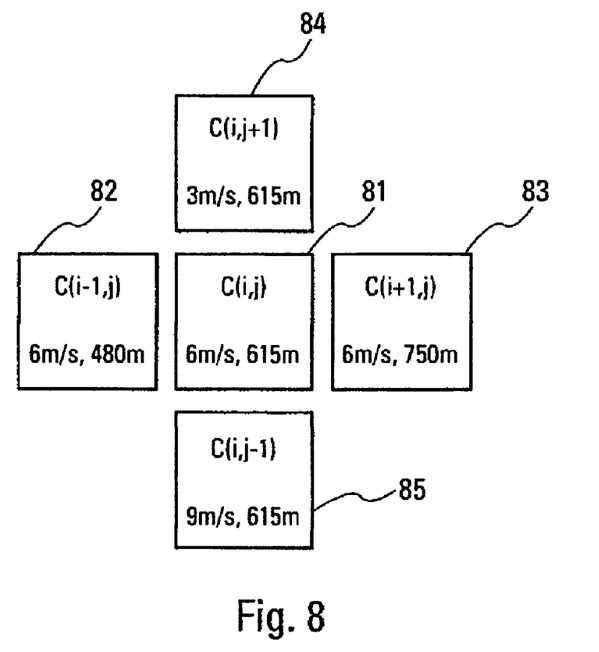
FIGS. 8 and 9, illustrations of the principle of inclusion of the adjacent model targets.
Figure 9:
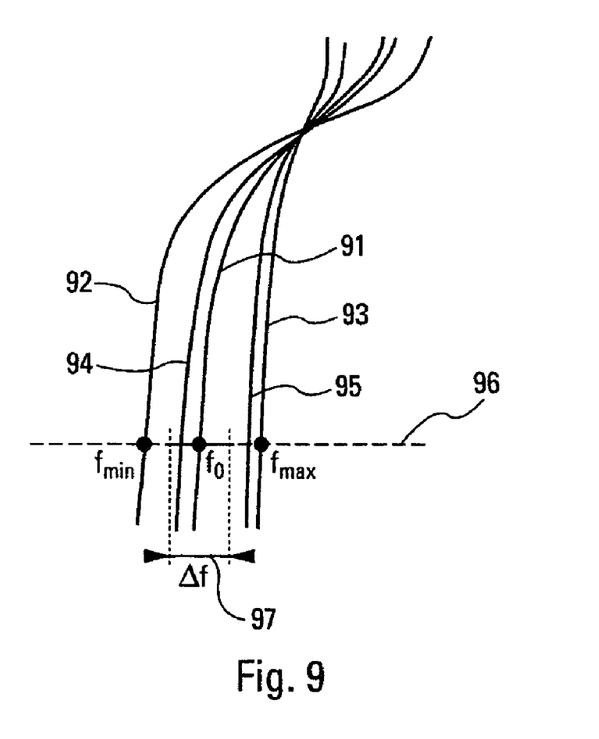

FIG. 8 illustrates the way in which the various model targets are positioned according to their parameters within the scope of the parameters examined. For simplicity of illustration, target models with only two parameters that are variable, the velocity and distance to the CPA, for example, have been considered. Thus, the target model having a velocity v of 6 m/s and a distance $d_{CPA}$ of 615 m is bracketed by four models 82, 83, 84 and 85, respectively having for their parameters:

v=6 m/s and $d_{CPA}$=480 m
v=6 m/s and $d_{CPA}$=750 m
v=3 m/s and $d_{CPA}$=615 m
v=9 m/s and $d_{CPA}$=615 m This bracketing is also applicable to all the real targets for which the parameters v and $d_{CPA}$ are between the limits defined by the four adjacent model targets.

Starting from this observation, it is possible to envisage adding to the inventive method a function making it possible to take into account, for one and the same model target, observation vectors with components $z_i$ that are located within a frequency band in a range defined by the four adjacent models. This frequency band can be, for example, defined as illustrated by FIG. 9.

FIG. 9 shows traces of the time-evolution curves of the frequency of the signal received by the buoy and originating from targets corresponding to the defined model targets. The curve 91 corresponds to the current model target, and the curves 92, 93, 94 and 95 correspond to the four adjacent model targets. For an instant $t_i$ corresponding to the spectral analysis of rank i, symbolically represented by the broken line 96, FIG. 9 shows that the signal corresponding to the current model target has the frequency $f_0$, whereas the signals corresponding to the adjacent targets have frequencies varying between $f_{min}$ and $f_{max}$. The figure also shows that if the observation vectors are generated exclusively from the frequency components of the signals corresponding to the model targets, some signals corresponding to real targets will not be taken into account by any observation vector.

To overcome this drawback, the construction of the observation vector is done by studying the spectral components $z_i$ for which the frequency is located in a given band 96 about the frequency $f_0$ of the signal corresponding to the model, and by selecting the component having the greatest amplitude. The size of the analysis frequency band 97 can, for example, be defined as extending from $f_0-(f_0+f_{min})/2$ to $f_0+(f_{max}-f_0)/2$.

The operation corresponding to the illustrations of FIGS. 8 and 9 can advantageously be incorporated in the inventive method and then makes it possible to judiciously limit the number of target models to be looked for in the signal received by the buoy. This has the beneficial effect of limiting the number of values given to each of the associated parameters $f_{CPA}$, v, $d_{CPA}$ and $t_{CPA}$. This operation can, for example, be incorporated in the task for generating the vector Z of the flow diagram described previously. We then have:

Generate the vector Z
   Start of loop on the instants $t_i$ of the N spectral analyses.
      Determine for the current model M the frequency limits from adjacent models.
      Choose the frequency index for which the amplitude of $z_i$ is maximum between the limits of a range of frequencies concerned, for the recurrence concerned.

$$P=P+P_i$$

$$Q=Q+Q_i$$

End of loop on the instants $t_i$ of the N spectral analyses.

As can be seen through its description, the inventive method relies in particular on a judicious choice of the target models studied. This choice can be facilitated by taking into account a few assumptions relating to the planned use of the results obtained by applying the method to the signal received by the buoy. These assumptions can in particular include:

the case of immobile targets for which changing the parameter $d_{CPA}$ is pointless;
limiting the spectral resolution allowed by the viewing mode chosen for the data obtained, a spectrogram for example;
limiting the observation time corresponding to the N analyses made.

These various limitations advantageously make it possible to limit the ranges of values covered by the various parameters.

The data contained in the MVF table can be used immediately by producing a representation of the MVF spectrum of the variations of the value of the criterion $\Lambda_g$ according to the frequency $f_{CPA}$.

The data in the MVF table can also be used to construct a synthetic spectrogram (lofargram) showing, as they are generated, the observation vectors retained, the amplitude of the trace displayed taking a constant value, dependent on the value of the criterion $\Lambda_g$ stored in the table, inasmuch as this value exceeds a fixed correlation threshold defining an adequate signal-to-noise ratio. For an excessively low value of $\Lambda_g$ no trace is displayed. In this way, a highly contrasting synthetic spectrogram is obtained, far more legible for an operator than a spectrogram obtained from single spectral analyses.

However, applying the inventive method advantageously offers other possibilities of use, possibilities associated with the knowledge for each observation vector of the parameters $f_{CPA}$, v, $d_{CPA}$, $t_{CPA}$ and $\theta_{CPA}$ of the model target being sought. These parameters can be used in practice to determine the position of the real targets detected by their mapping with a given model and from this produce a cartographic representation. The real targets normally correspond to observation vectors having produced a strong criterion $\Lambda_g$. The following algorithm, given as an example, describes a method with which to produce a geographic representation of the detected targets:

Zero the synthetic geographic image
    Loop on the spectral channels of the MVF spectrum
    Search in the MVF table for the local maxima of the criterion $\Lambda_g$;
    Select the local maxima greater than a threshold corresponding to an adequate signal-to-noise ratio;
    Aggregate the selected local maxima: retain the greatest of the maxima out of the adjacent maxima located in a narrow frequency band;
    Calculate the positions of the noise generators from the parameters $f_{CPA}$, $d_{CPA}$, $t_{CPA}$, v and $\theta_{CPA}$ associated with the maxima retained after aggregation;
    Calculate the uncertainties with which the parameters $(f_{cpa}, d_{cpa}, t_{cpa}, v, \theta_{cpa})$ are estimated;
    Generate the geographic image by positioning light or colored spots within a frame of reference, each spot corresponding to the geographic position of the noise generator associated with one of the retained maxima. The spot represented is centered on the point defined by the parameters associated with the maximum concerned. Its form is roughly that of an ellipse, the dimensions of which are dependent on the estimated uncertainties on the associated parameters $f_{CPA}$, $d_{CPA}$, v, $t_{CPA}$ and $\theta_{CPA}$. The intensity or the color of the spot depends on the value of the corresponding criterion $\Lambda_g$. In the areas of juxtaposition, the intensity associated with the superimposition of several spots is determined by a combination of the values of the corresponding criteria $\Lambda_g$. This combination can, for example, be a simple addition.
End of loop on the spectral channels of the MVF signal.

Figure 10:
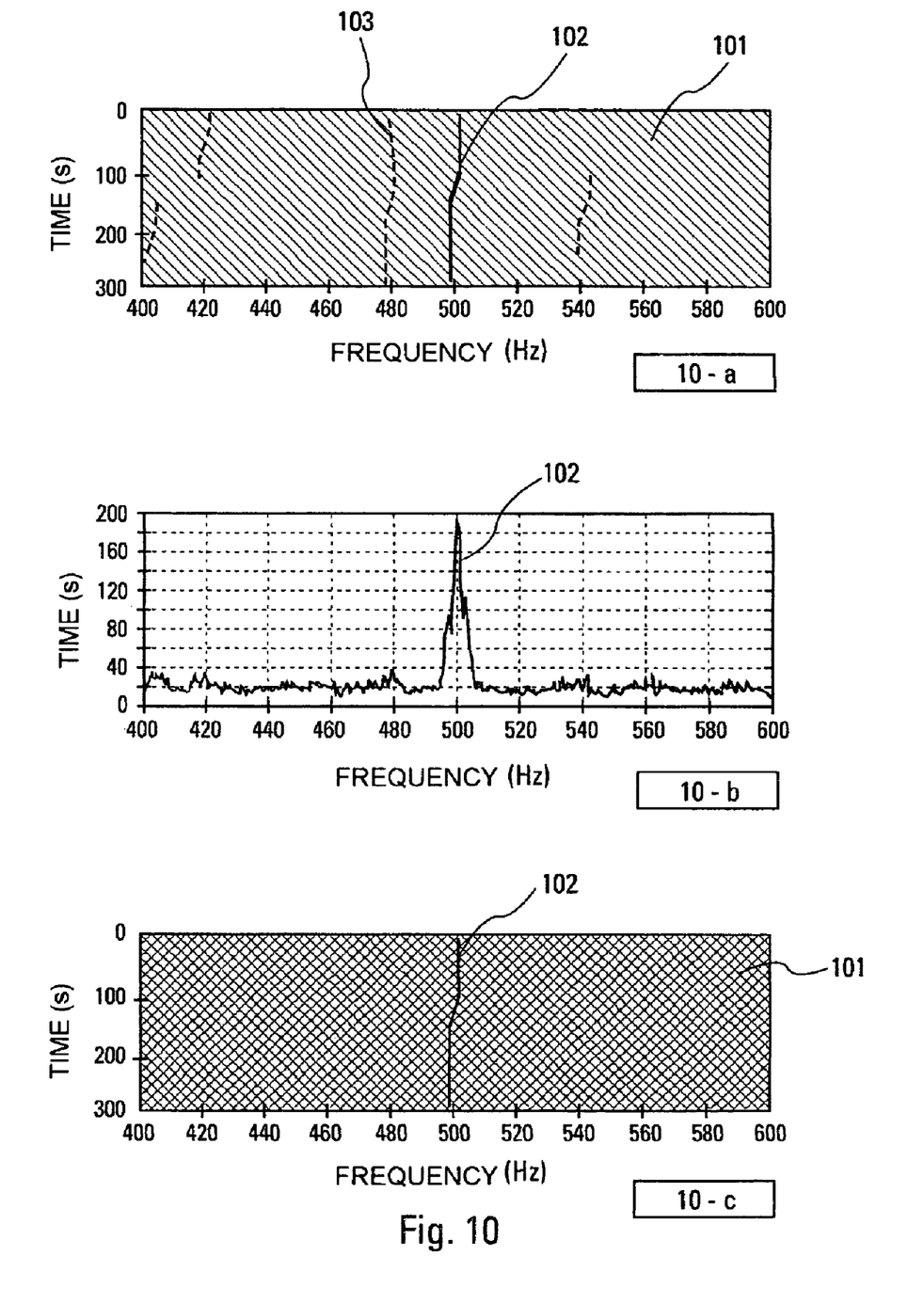
FIG. 10, an example of analysis, in the form of a synthetic spectrogram, of the data obtained by the inventive method.
Figure 11:
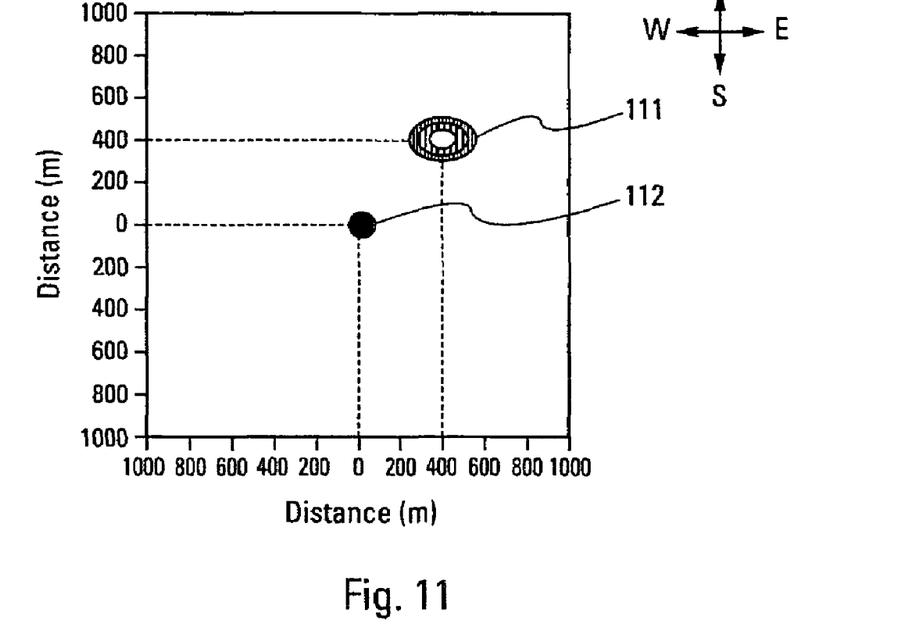
FIG. 11, an example of analysis in the form of a geographic representation of the same data.

These three types of representation are illustrated by the three frequency-oriented representations of FIG. 10 and by the representation of FIG. 11. These representations are given by way of example.

FIG. 10 illustrates the generation from the inventive method of the synthetic spectrogram 10-c from a real spectrogram 10-a. The effect produced by the inventive method can be compared to a selective amplification of the contrast between the intensity assigned to the ambient noise 101 and to the signals with weak $\Lambda_g$ 103, and the intensity assigned to the wanted signal 102 with strong $\Lambda_g$.

The spectrogram 10-b graphically represents the value of $\Lambda_g$ according to the frequency $f_{CPA}$, this data being extracted from the MVF table constructed by applying the inventive method to the signals represented on the spectrogram 10-a. With regard to the wanted signal 102, it can be seen that the duly calculated criterion does indeed have a contrast-amplifying effect.

FIG. 11 gives, as an example, a simplified illustration of a geographic representation of the results obtained by the inventive method. As stated previously, the parameters $d_{CPA}$, $t_{CPA}$, v and $\theta_{CPA}$ contained in the MVF table can be used to determine the position of the target detected at the instant corresponding to the end of the processing of N spectral analyses. The geographic representation of FIG. 11 shows the presence of a target 111 identified by its distance to the buoy projected on the north-south and west-east directions. In the example of FIG. 11, the target represented corresponds to the target 102 revealed on the synthetic spectrogram 10-c.

The illustrations of FIGS. 10 and 11 can be used to confirm practically the advantages offered by the use of the inventive method compared to the conventional methods known from the prior art. This advantage is all the greater given that the detection equipment, namely the buoy equipped with acoustic antennas, remains the same as the buoy supplying signals to a more conventional processing.

Figure 12:
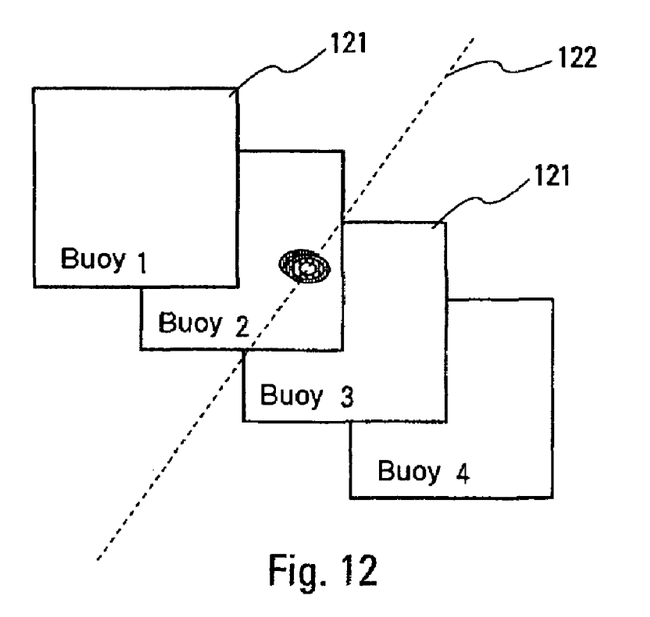
FIG. 12, the illustration of an application of the method to the merging of the data originating from several buoys.

The use in cartographic form of the data contained in the MVF table also makes it possible to associate information originating from several buoys, as illustrated in FIG. 12. The simultaneous use of the signals received by several buoys forming a sort of barrage advantageously makes it possible to create a genuine map of the path 122 taken by the target throughout the time when it is located near to one or other of the buoys. The knowledge of the relative positions of the cooperating buoys and the existence of a common time reference makes it possible in fact to associate, as in FIG. 12, the synthetic geographic images 121 produced from each of the buoys.

The inventive method as described in the above text therefore offers the main advantage of more comprehensively exploiting the information contained in the signal received by the buoy. Identifying the received signal with target models for which the parameters are determined makes it possible, in the case where the identification is positive, to assign all the parameters of the model to the detected target.

The method described in the above text can be applied by means of any directional buoys, if these buoys supply, as in the example of the DIFAR buoys, an azimuth indication. It is also possible to apply this type of method to non-directional buoys, within the context of a degraded mode operating without the azimuth indication not supplied by the buoys.

The invention claimed is:

1. A method of processing the complex amplitude-azimuth spectrum of an acoustic signal received by a directional buoy, comprising the steps of:

associating complex frequency components of the received signal, located along the time-evolution curve of the frequency of a signal for different target models envisaged, corresponding to a model target, and comparing the modulus and azimuth variation of these frequency components with the modulus and azimuth variation over time of the spectral components of the signal corresponding to the model, the processing using both the amplitude and azimuth information contained in the received signal.

2. The method as claimed in claim 1, wherein, a certain number of model targets are defined by their parameters $f_{CPA}$, $d_{CPA}$, v and $t_{CPA}$, each of these parameters possibly taking fixed values from a predetermined set of values, said method further comprising the following steps:

constructing a vector M, the time-evolution model of the spectrum of the signal originating from a model target moving relative to the buoy, the model target being defined by its parameters $f_{CPA}$, $d_{CPA}$, v and $t_{CPA}$;

constructing an observation vector Z having the same frequency-evolution characteristics, each component of the vector Z corresponding to the spectral component of the received signal whose frequency is located, at the instant concerned, roughly along the frequency-evolution curve followed by the components of the model vector M;

comparing the vector Z to the vector M, made using a probability criterion $\Lambda_g$; the comparison making it possible to determine for each possible value of the parameter $f_{CPA}$, the model target for which the value of the criterion $\Lambda_g$ is the greatest, this comparison step comprising an operation for calculating the angle $\theta_{CPA}$ between north and the buoy—CPA direction corresponding to the evolution model concerned, storing in an MVF table, for each value of $f_{CPA}$, parameters $d_{CPA}$, v, $t_{CPA}$; , $\Lambda_g$ and $\theta_{CPA}$ relating to the model target for which the value of $\Lambda_g$ is the greatest;

the steps being implemented a number of times equal to the number of model targets available.

3. The method as claimed in claim 2, further comprising a final step for analyzing the data included in the MVF table, this step consisting in producing a synthetic spectrogram displaying, in a time-frequency plane, traces corresponding to the evolution over time of the different model targets identified in the received signal, the display of a trace being dependent on the comparison with a threshold of the value of the calculated criterion $\Lambda_g$ and the intensity of the trace displayed being dependent on the value of $\Lambda_g$.

4. The method as claimed in claim 2, further comprising a final step for analyzing the data contained in the MVF table, this step producing a geographic representation of the time evolution of the model targets identified in the received signal, each identified target being represented by a trace whose coordinates relative to the buoy are given by the values of $d_{CPA}$, v, $t_{CPA}$ and $\theta_{CPA}$, the display of which is dependent on the comparison relative to a threshold of the value of the calculated criterion $\Lambda_g$ and the intensity or the color of which are dependent on the value of $\Lambda_g$.

5. The method as claimed in claim 2, wherein the criterion $\Lambda_g$ is expressed:

$$\Lambda_g(Z) = \frac{|M*Z|^2}{2\|M\|^2}.$$

6. The method as claimed in claim 2, wherein the angle $\theta_{CPA}$ is expressed:

$$\theta_{cpa} = \arg\left(\frac{\overline{M}Z}{\|M\|^2}\right).$$

7. An application of the method as claimed in claim 4 to the analysis of the geographic representations obtained by simultaneously using several buoys with overlapping listening areas, the set of geographic representations obtained making it possible by overlaying to reconstruct a portion of the trajectory followed by an identified target.

8. The method as claimed in claim 3, wherein the criterion $\Lambda_g$ is expressed:

$$\Lambda_g(Z) = \frac{|M*Z|^2}{2\|M\|^2}.$$

9. The method as claimed in claim 4, wherein the criterion $\Lambda_g$ is expressed:

$$\Lambda_g(Z) = \frac{|M*Z|^2}{2\|M\|^2}.$$

10. The method as claimed in claim 3, wherein the angle $\theta_{CPA}$ is expressed:

$$\theta_{cpa} = \arg\left(\frac{\overline{M}Z}{\|M\|^2}\right).$$

11. The method as claimed in claim 4, wherein the angle $\theta_{CPA}$ is expressed:

$$\theta_{cpa} = \arg\left(\frac{\overline{M}Z}{\|M\|^2}\right).$$

12. The method as claimed in claim 7, wherein the criterion $\Lambda_g$ is expressed:

$$\Lambda_g(Z) = \frac{|M*Z|^2}{2\|M\|^2}.$$

13. The method as claimed in claim 7, wherein the angle $\theta_{CPA}$ is expressed:

$$\theta_{cpa} = \arg\left(\frac{\overline{M}Z}{\|M\|^2}\right).$$

14. The method as claimed in claim 12, wherein the angle $\theta_{CPA}$ is expressed:

$$\theta_{cpa} = \arg\left(\frac{\overline{M}Z}{\|M\|^2}\right).$$

* * * * *